US 6,935,755 B2

United States Patent
Soper et al.

(10) Patent No.: US 6,935,755 B2
(45) Date of Patent: Aug. 30, 2005

(54) PERSONAL ENTERTAINMENT ARRANGEMENT

(75) Inventors: Kevin James Soper, Hope Valley (AU); Phillip Brendan Banks, Modbury Heights (AU)

(73) Assignee: Digislide International Pty Ltd, Adelaide (AU)

(*) Notice: Subject to any disclaimer, the term of this patent is extended or adjusted under 35 U.S.C. 154(b) by 283 days.

(21) Appl. No.: 10/640,700

(22) Filed: Aug. 13, 2003

(65) Prior Publication Data

US 2004/0085484 A1 May 6, 2004

Related U.S. Application Data

(63) Continuation of application No. PCT/AU02/00154, filed on Feb. 14, 2002.

(30) Foreign Application Priority Data

Feb. 14, 2001 (AU) .............................................. PR3067

(51) Int. Cl.[7] .............................................. G03B 21/14
(52) U.S. Cl. ...................................................... 353/122
(58) Field of Search ............................. 353/12, 13, 14, 353/28, 119, 122

(56) References Cited

U.S. PATENT DOCUMENTS

| 3,904,289 | A | | 9/1975 | Yager |
| 3,940,209 | A | | 2/1976 | Portner et al. |
| 4,013,353 | A | | 3/1977 | Portner et al. |
| 4,048,653 | A | | 9/1977 | Spooner |
| 5,123,728 | A | | 6/1992 | Gradin et al. |
| 5,453,803 | A | | 9/1995 | Shapiro et al. |
| 5,457,575 | A | | 10/1995 | Groves et al. |
| 5,570,944 | A | * | 11/1996 | Seder et al. .................. 353/98 |
| 5,622,419 | A | | 4/1997 | Holder et al. |
| 5,639,152 | A | | 6/1997 | Nelson |

* cited by examiner

Primary Examiner—William C. Dowling
(74) Attorney, Agent, or Firm—Francis Law Group

(57) ABSTRACT

A personal entertainment unit including a chair having at least one arm within which is housed a projector. The arm includes a door enabling an image to be projected from the projector outside of the arm. The door, when closed, hides the projector from view. Alternatively, the door may be located on top of the arm and a periscope configuration is used to project the image upwardly and then horizontally from the arm to be displayed on a surface. The door is generally electrically driven and, when in a closed position, is flush with the upper surface of the arm.

9 Claims, 5 Drawing Sheets

PERSONAL ENTERTAINMENT ARRANGEMENT

This application is a continuation Application of International Application No. PCT/AU02/00154, filed Feb. 14, 2002, which claims priority from Australia Application No. PR3067, filed Feb. 14, 2001.

The present invention relates to personal entertainment arrangements and in particular to a lounge arrangement having inbuilt audio and visual arrangements.

BACKGROUND OF THE INVENTION

Home entertainment of the type including audio and visual stimulation has over time become more and more sophisticated. Nowadays, it is not uncommon, albeit not cheap, for home entertainment units to have multiple audio speakers combined with a television front or rear projection screen acting as a home theatre.

To provide a good image such units are necessarily large, occupying significant physical space and are fixed in position mainly due to their weight. They are also expensive and at times difficult to manage and repair.

Furthermore, the screens are not adapted to take into account personal seating arrangements nor are they storable away from sight when not in use.

It is therefore an object of the present invention to overcome at least some of the abovementioned problems or provide the public with a useful alternative. This is achieved by providing for a lounge or armchair having an integral image projecting apparatus adapted to project the image out and away from the armchair so that it may be viewed by a plurality of people.

SUMMARY OF THE INVENTION

Therefore, in one form of the invention there is proposed a personal entertainment unit including a seating chair having at least one arm, the arm including an aperture located at the top of the arm and a cavity within which is housed an image projecting device adapted to project an image; and a periscope having a rotatable and a fixed flap, the rotatable and fixed flaps holding mirrors, the rotatable flap being rotatably driven between a first position where it is substantially co-planar with the upper surface of the arm and a second position where it is at a substantial angle to the upper surface of the arm, the mirror on the fixed flap causing the image to be projected generally upwardly from the image projecting device and onto the mirror on the rotatable flap, the mirror on the rotatable flap when in the second position causing the image to be projected generally horizontally outwardly from said unit.

Preferably, the aperture houses the rotatable flap, which, when in the second position, enables the image to be projected outside of the arm.

Preferably, the rotatable flap, when in the first position, is flush with the upper surface of the arm and hides the image projecting device and fixed flap from view.

Preferably, the image projecting device includes a LCD screen.

Preferably, the rotatable flap is electrically driven.

Preferably, the personal entertainment unit further includes at least one additional electronic device, such as video or DVD players as well as computer processing means whose output is adapted to control an image on the LCD screen.

Of course, it is to be understood that other optical components may be necessary to ensure the LCD screen works properly. These have been discussed in applicants' previous patent applications in relation to LCD projectors, whose contents are incorporated by reference herein.

BRIEF DESCRIPTION OF THE DRAWINGS

The accompanying drawings, which are incorporated in and constitute a part of this specification, illustrate several implementations of the invention and, together with the description, serve to explain the advantages and principles of the invention. In the drawings.

DESCRIPTION OF THE PREFERRED EMBODIMENTS

The following detailed description of the invention refers to the accompanying drawings. Although the description includes exemplary embodiments, other embodiments are possible, and changes may be made to the embodiments described without departing from the spirit and scope of the invention. Wherever possible, the same reference numbers will be used throughout the drawings and the following description to refer to the same and like parts.

Figure 1:
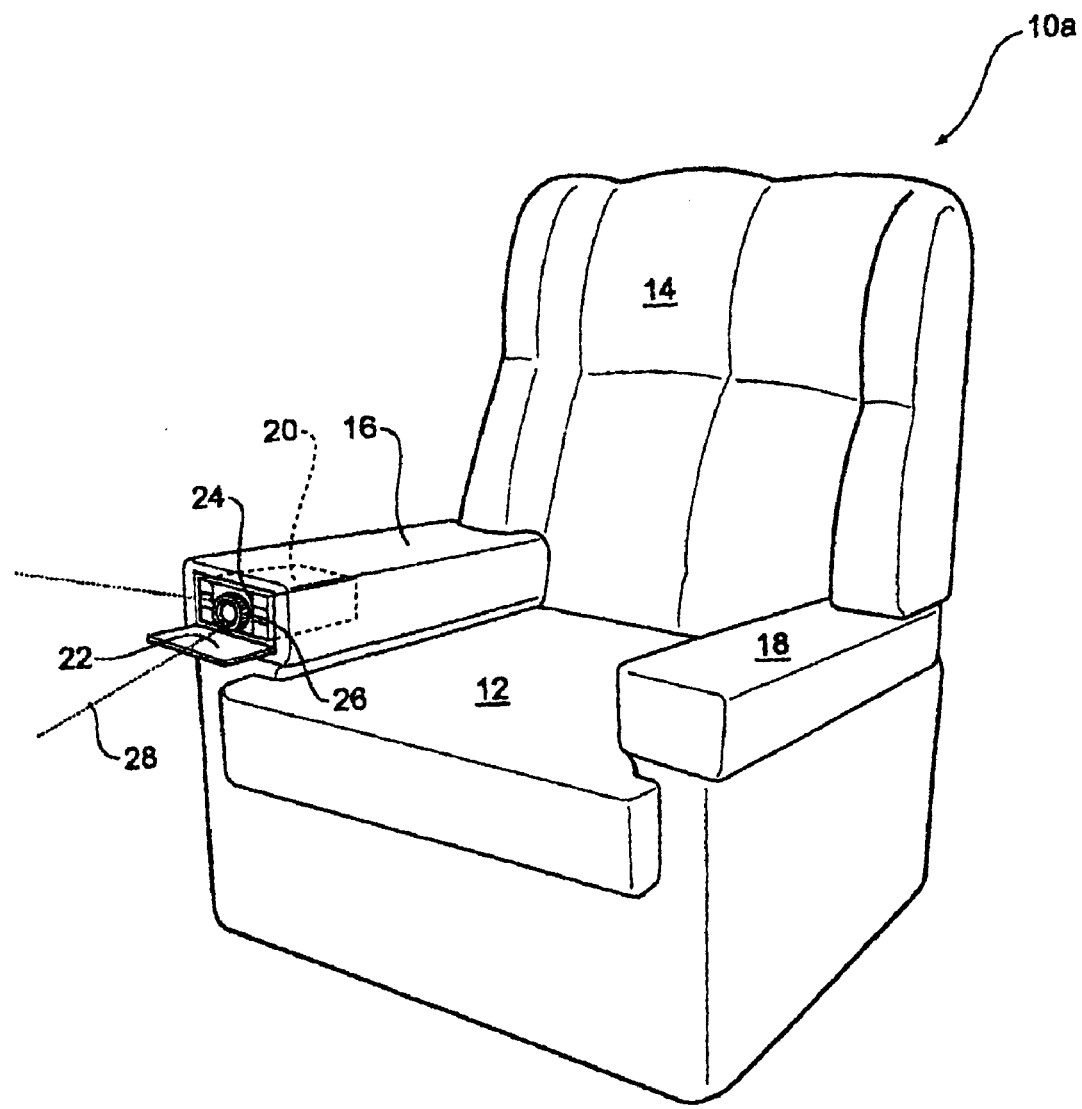
FIG. 1 is a perspective view illustrating a first embodiment of a home entertainment unit including a one-seater lounge chair.

Referring to FIG. 1 there is shown a lounge chair 10a including a seat 12, backrest 14, right hand side arm rest 16 and left hand side arm rest 18. At least one armrest, in this illustration 16, is wide enough for a cavity 20. A trap door 22 located at the end of the arm 16 opens outwardly enabling access to and form the cavity. Located within the cavity is a visual projecting means 24 including a focussing lens 26. The projecting means may be of a type including a LCD screen. Light 28 that has passed through the screen is projected out of the projected and onto a surface to display an image. Although not shown a plurality of optical components may be used to assist in obtaining an image. These may be chosen from various spectrum filters, polarisers and both focussing and magnifying lenses. The image generating and projecting device may be a well-known slide projector incorporating an LCD screen.

Those skilled in the art will now appreciate that when a person wishes to view a projected image all they need to do is operate the trap door and the projector housed in the lounge chair. When viewing is no longer required, the trap door is closed and the projector means is hidden from view. Not only does this provide a more attractive visual ambiance but it also protects equipment from dust, unauthorised tampering, or even removal.

Figure 2:
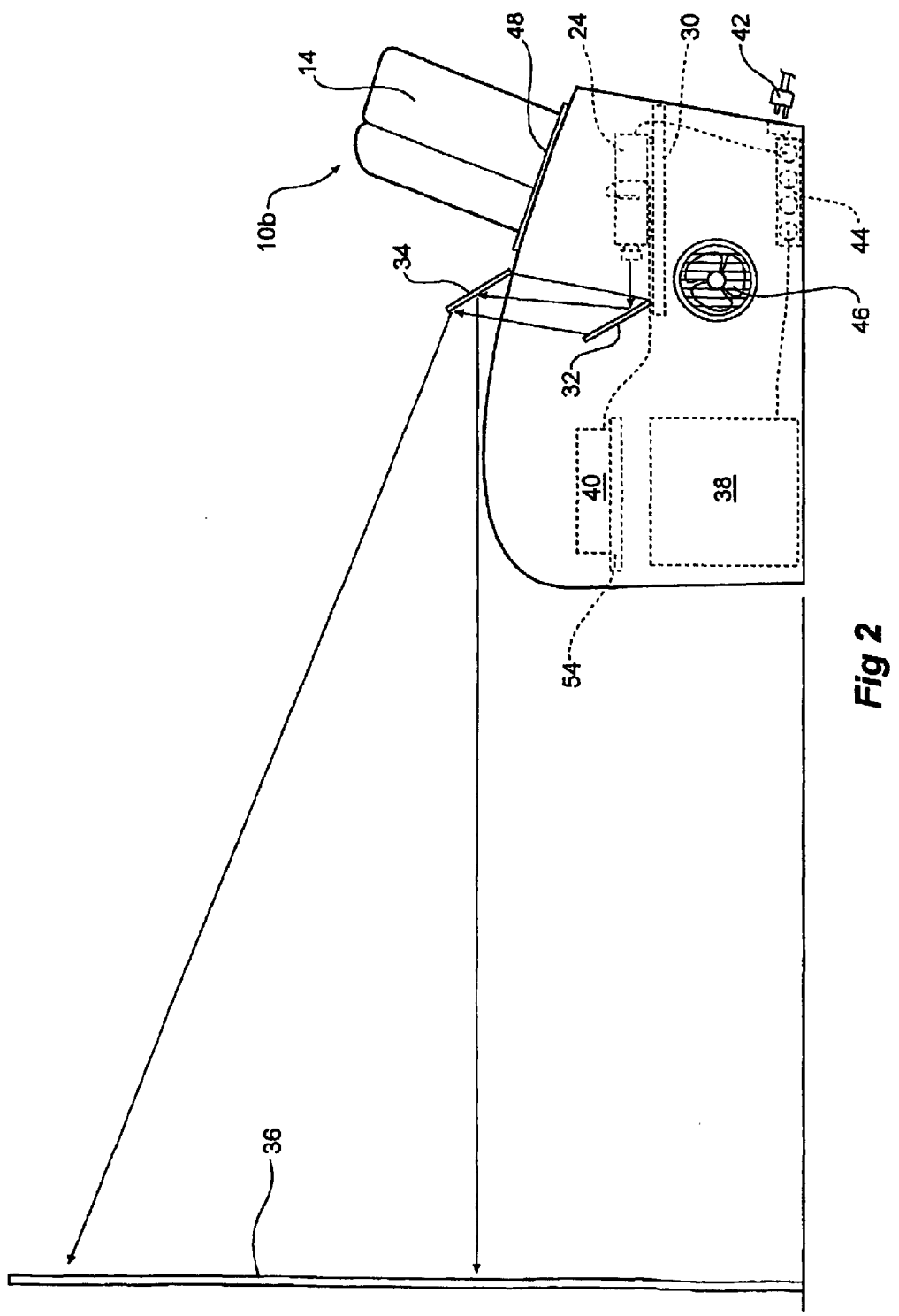
FIG. 2 is a side elevation view, illustrating a second embodiment of the present invention when used with a single seater lounge chair.

In an alternate configuration, illustrated in FIG. 2, the projector is housed towards the rear of the armrest and supported on a shelf 30 deep within the armrest. The image produced by the projector is then projected out of the armchair 10b by the use of a first mirror 32 that projects the image upwardly to a second mirror 34 that then projects the image forwardly from the chair 10b to display it onto screen 36.

This configuration allows one to have other necessary devices that may assist in creating images such as a computer or games console 38 and a video/DVD player 40. Power to such a device may be supported via electrical connection 42, a power board 44 within the armchair 10b providing power to various electrical devices housed within. Other devices may then be attached to the device, such as speakers (not shown).

Fan 46 may be used to provide for the necessary airflow to effect sufficient cooling of the various devices. A liftable flap 48 may provide access to the projector. This flap may also allow for better circulation of air through the chair.

Thus one can see that the present invention provides for a lounge chair that internally houses and stores both image generating and projecting means. In contrast to existing chairs that may hold such devices where a screen is provided for the individual viewing of a user, the use of a projecting means allows a much larger image to be displayed on a surface, such as a wall. This allows other people, besides the person in the chair, to view and enjoy the image.

Figure 3:
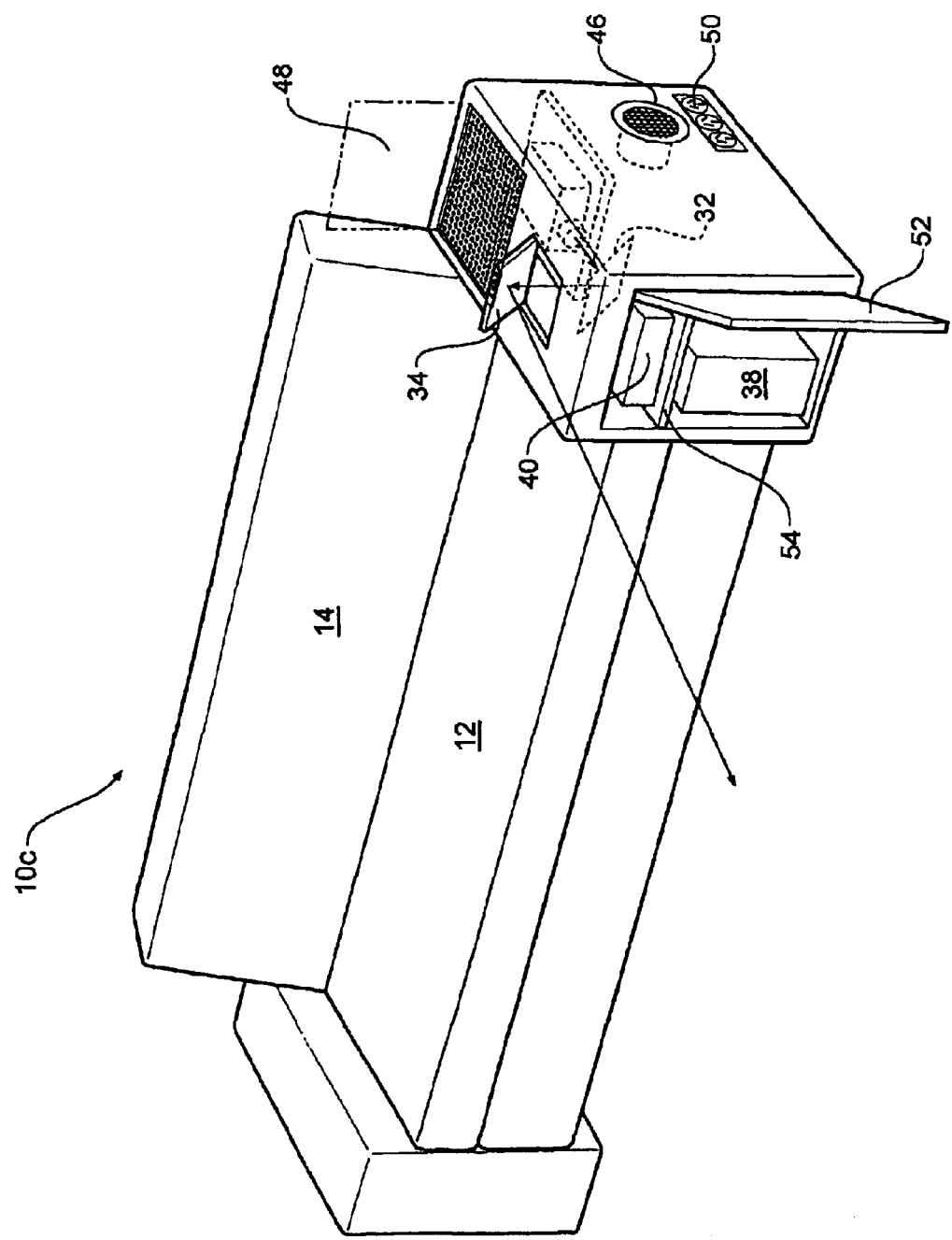
FIG. 3 is a perspective view illustrating a third embodiment of the present invention wen used with a multi-seater lounge suite.

Referring now to FIG. 3, the equipment may very well be housed in a lounge suite 10c rather than a chair. Such a suite may include a separate power board 50 enabling one to externally provide power to various devices. Access to equipment other than the projector may be provided by a trap door 52 located at the front of the arm housing the projecting equipment. A shelf 54, also found in the chair illustrated in FIG. 2, provides the necessary support for different equipment.

Access to controls or the projector is via flap 46 on top of the arm surface 36. A door 48 allows access to video player 22 and computer processing device 28.

Figure 4:
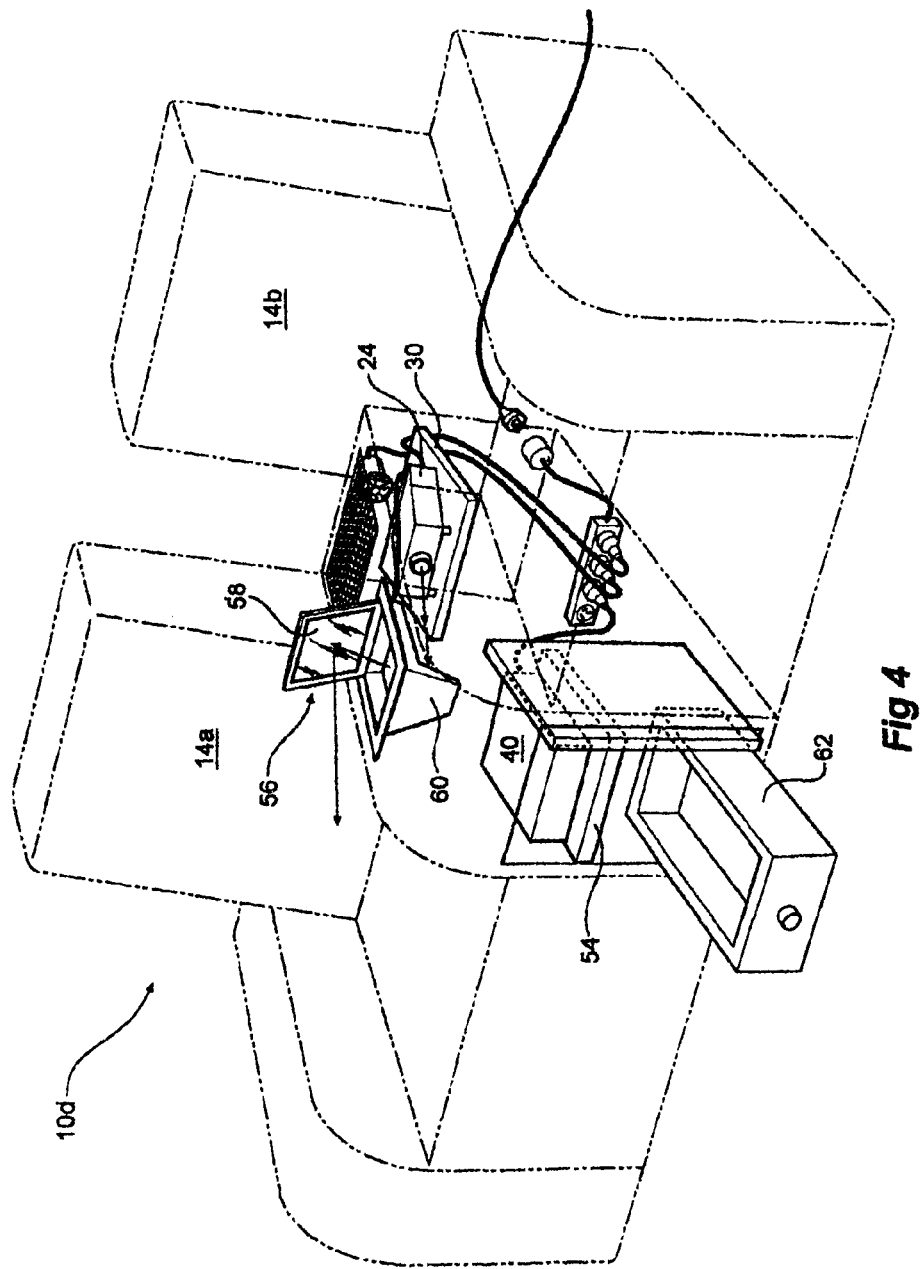
FIG. 4 is a perspective view illustrating a fourth embodiment of a home entertainment unit having two side-by-side lounge chairs.

In a further embodiment of the present invention, illustrated in FIG. 4, two side-by-side lounge chairs may include a common central armrest that is adapted to house the various equipment necessary to outwardly project an image. Instead of having two separate mirrors, a periscope device 56 is provided having a pivotable mirror 58 and a fixed flap 60 also having a mirror on its inside surface. The mirrors are so aligned that when the mirror 58 is pivoted upwardly as illustrated in FIG. 4, a forward image is projected out of the lounge suite.

Such a combination lounge chair may also include various storage compartments such as drawer 62.

Figure 5:
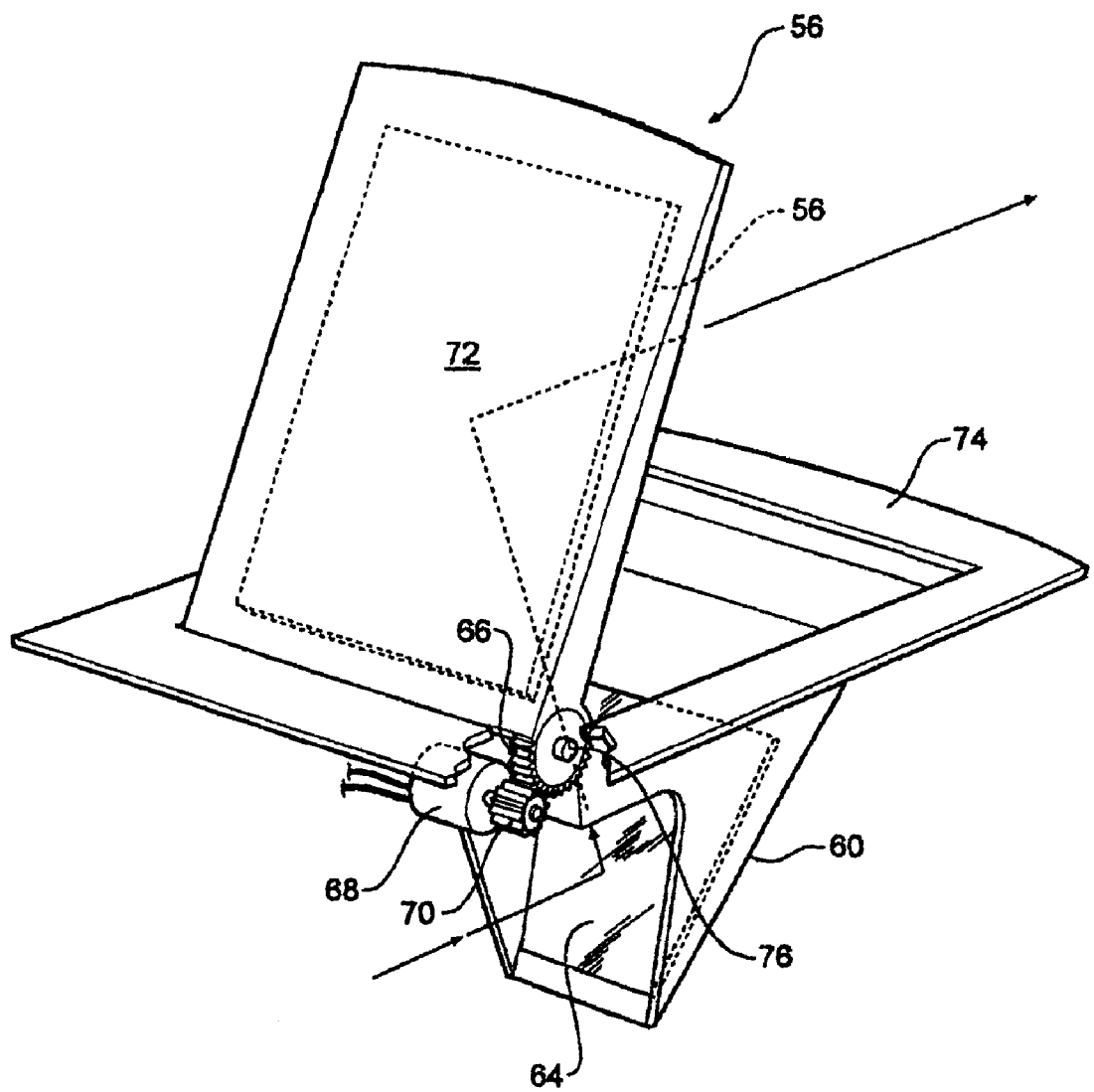
FIG. 5 is a perspective view illustrating in detail the driven mirror assembly according to an embodiment of the present invention.

The periscope device 56 is illustrated in more detail in FIG. 5. Mirror 64 is mounted on the inside of flap 60 whilst mirror 58 is mounted on pivotable flap 72. Pivotable flap includes at its rear end a partially geared wheel 66. Electric motor 68 drives said wheel 66 through gear 70 to raise the flap from a position where it is flush with a surround 74 to a position where it is at a substantially angle to the surround 74. The flap 72 thus rotates around pivot point 76, the amount of rotation controlled by the motor 68.

Those skilled in the art will now appreciate that the use of a projecting means over conventional home theatre arrangements has a number of advantages and ones where a screen mounted on an arm is mounted in front and close proximity to the user.

Firstly, the image can be seen by a plurality of users rather than just the one in that position on the chair. Further, instead of expensive screens and mechanical arm couplings that are deigned to bring the screen out of the chair, an image can be simply created using a projector of the type having an LCD screen with suitable optics. Light passes through the LCD screen that imparts its image to the passing light. That light is then optically treated by use of suitable lenses to be then displayed on a screen. In this way a large image of several meters in area may be created rather cheaply as compared to front or rear projection television screens.

Further advantages and improvements may very well be made to the present invention without deviating from its scope. Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

What is claimed is:

1. A personal entertainment unit comprising:

a seating chair including at least one arm having an upper surface, said arm including an aperture located at the top of said arm, said arm further including a cavity within which is housed an image projecting device adapted to project an image; and a periscope including a rotatable and a fixed flap, said rotatable and fixed flaps holding mirrors, said rotatable flap being rotatably driven between a first position where it is substantially co-planar with said upper surface of said arm and a second position where it is at a substantial angle to said upper surface of said arm, said mirror on said fixed flap causing said image to be projected generally upwardly from said image projecting device and onto said mirror on said rotatable flap, said mirror on said rotatable flap when in said second position causing said image to be projected generally horizontally outwardly from said unit.

2. The personal entertainment unit of claim 1, wherein said aperture houses said rotatable flap which when in said second position enables said image to be projected outside of said arm.

3. The personal entertainment unit of claim 2, wherein said first position is flush with said upper surface of said arm and hides said image projecting device and fixed flap from view.

4. The personal entertainment unit of claim 1, wherein said image projecting device includes a LCD screen.

5. The personal entertainment unit of claim 1, wherein said rotatable flap is electrically driven.

6. The personal entertainment unit of claim 1, wherein said unit further includes at least one additional electronic device.

7. The personal entertainment unit of claim 6, wherein said electronic device comprises a video recorder.

8. The personal entertainment of claim 6, wherein said electronic device comprises a DVD layer.

9. The personal entertainment of claim 6, wherein said electronic device comprises computer processing means whose output is adapted to control an image on said LCD screen.

\* \* \* \* \*